(12) United States Patent
Irwin

(10) Patent No.: US 6,409,626 B1
(45) Date of Patent: Jun. 25, 2002

(54) AXLE ASSEMBLY HAVING A DIFFERENTIAL CASE ADJUSTABLY SECURED TO A HOUSING

(75) Inventor: Earl James Irwin, Fort Wayne, IN (US)

(73) Assignee: Spicer Technology, Inc., Ft. Wayne, IN (US)

( * ) Notice: Subject to any disclaimer, the term of this patent is extended or adjusted under 35 U.S.C. 154(b) by 0 days.

(21) Appl. No.: 09/605,864

(22) Filed: Jun. 29, 2000

(51) Int. Cl.$^7$ .............................................. F16H 48/08
(52) U.S. Cl. ......................... 475/230; 384/583; 74/409
(58) Field of Search ........................... 475/230; 74/424, 74/409; 384/583

(56) References Cited

U.S. PATENT DOCUMENTS

| 997,606 | A | | 7/1911 | Demmler | |
|---|---|---|---|---|---|
| 1,471,915 | A | | 10/1923 | Page | |
| 1,476,329 | A | | 12/1923 | Duesenberg | |
| 1,575,176 | A | | 3/1926 | Moorhouse | |
| 2,061,009 | A | | 11/1936 | Rothrock | |
| 2,546,969 | A | * | 4/1951 | Buckendale | ............. 475/230 X |
| 2,651,216 | A | * | 9/1953 | Alden | ..................... 475/230 X |
| 3,915,267 | A | | 10/1975 | Shea | |
| 4,467,672 | A | | 8/1984 | Lamy | |
| 4,597,311 | A | * | 7/1986 | Takeda | ................... 475/230 X |
| 4,733,578 | A | | 3/1988 | Glaze et al. | |
| 5,363,722 | A | | 11/1994 | Klotz | |
| 5,624,345 | A | * | 4/1997 | Graft et al. | .................. 475/230 |
| 5,806,371 | A | * | 9/1998 | Hibbler et al. | ................. 74/409 |
| 5,913,745 | A | * | 6/1999 | Inagaki et al. | .............. 475/230 |
| 6,227,716 | B1 | * | 5/2001 | Irwin | .......................... 384/583 |

* cited by examiner

Primary Examiner—Charles A Marmor
Assistant Examiner—Ankur Parekh
(74) Attorney, Agent, or Firm—Liniak, Berenato, Longacre & White

(57) ABSTRACT

An axle assembly employs a simple adjustable connection between the differential case and the housing to adjust the position of the ring gear relative to the pinion gear. A pair of adjustment collars facilitates positioning the differential case to selectively position the ring gear relative to the pinion gear of an input shaft. The adjustment collars threadingly engage the differential case. Bearings are disposed between the adjustment collars and the housing. The adjustment collars are rotated to position the differential case together with the ring gear. The adjustment collars are also provided to adjust the preload of the bearings. A locking collar is employed to lock the adjustment collars once the differential case and ring gear are properly positioned. In an alternate embodiment a single adjustment collar is employed. Shims and spacers are utilized to position the differential case and ring gear and the adjustment collar used to adjust the preload of the bearings.

10 Claims, 4 Drawing Sheets

AXLE ASSEMBLY HAVING A DIFFERENTIAL CASE ADJUSTABLY SECURED TO A HOUSING

FIELD OF THE INVENTION

The present invention relates to an adjustable differential case in an axle assembly and more particularly to an adjustment collar for selectively positioning a differential case and ring gear relative to a housing and pinion gear.

DESCRIPTION OF THE PRIOR ART

Axle assemblies of the prior art include a differential case mounted in the carrier of the axle assembly. A ring gear is often formed on an outer peripheral surface to interface with a pinion gear to drive the ring gear and provide power to the axles. Many ring gears are formed of a separate piece and are bolted to the differential case. In such a case, to account for assembly tolerances, shim packs may be disposed between the ring gear and the differential case to properly align the ring gear with the pinion gear once the differential assembly is installed in the carrier. Such prior art assemblies are costly, cumbersome, and required the differential case to be removed from the carrier and the ring gear detached from the differential case in order to adjust the portion of the ring gear. Often the prior art differential assemblies provide no significant means to adjust the position of the ring gear resulting in reduced performance and premature wear of the axle assembly.

SUMMARY OF THE INVENTION

The present invention is directed to an axle assembly with an adjustment mechanism to adjust the position of the ring gear relative to the housing and consequently the pinion gear. A pair of adjustment collars are provided on opposite sides of the differential case and disposed between the differential case and the housing. A pair of bearings are disposed between the adjustment collars and the housing to provide a rotatable connection between the differential case and the housing. The adjustment collars threadingly engage the differential case whereby rotation of the adjustment collar cause the differential case together with the ring gear to move along its axis of rotation. One of the adjustment collars is first rotated to position the differential case and the second adjustment collar is thereafter rotated to adjust the preload of the bearings. In an alternate embodiment a single adjustment collar is provided. A spacer of select thickness is disposed between one of the bearings and the housing and a select number of shims are disposed between the first bearing and the differential case to properly position the differential case and ring gear. Once the differential case and ring gear are properly positioned, the adjustment collar is rotated to adjust bearing preload. In both embodiments, once the differential case is positioned and bearing preload established, a locking member is employed to lock the adjustment collar in place.

DETAILED DESCRIPTION OF THE PREFERRED EMBODIMENT

Figure 1:
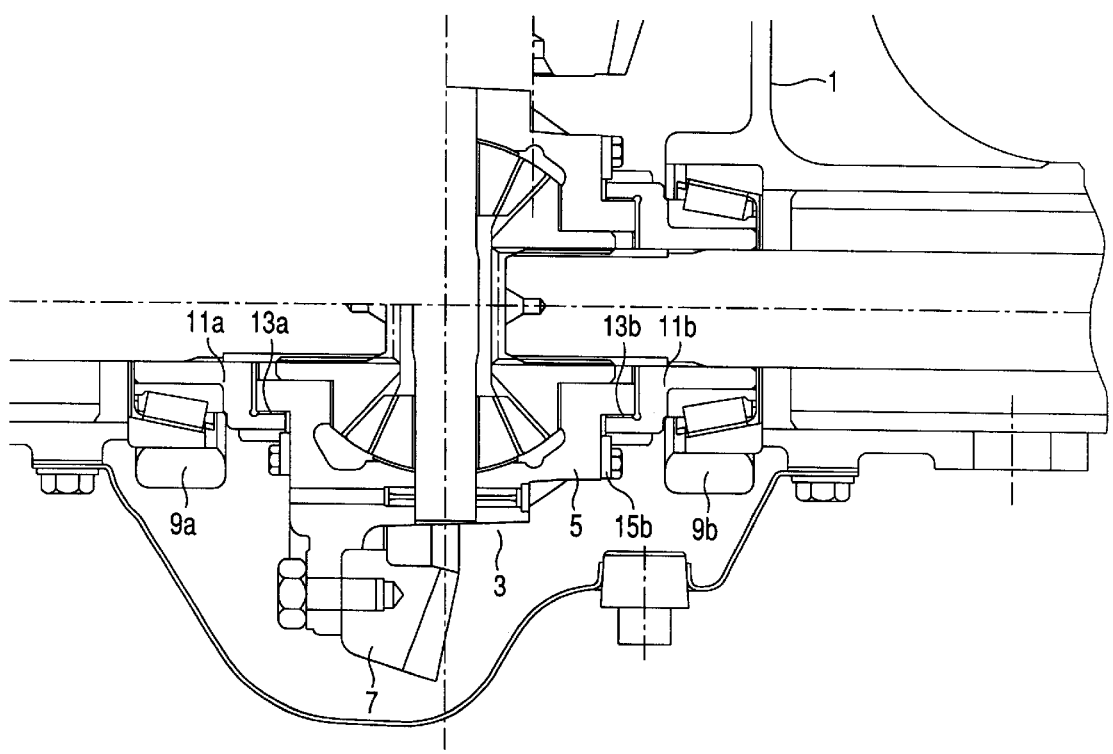
FIG. 1 is a partial sectional view of an axle assembly with adjustable differential gear assembly according to the present invention.

Referring to FIG. 1, an axle assembly contains a housing 1 and a differential gear assembly generally shown as 3 rotatably disposed within the housing 1. The differential assembly 3 includes a differential case 5 and a ring gear 7 fixed thereto. The ring gear 7 may be fixed to the differential case 5 by bolting or other suitable fashion as is known in the art. Further details of the differential gear assembly 3 will not be explained as such components are well known in the art. The differential case 5 is rotatably disposed within the housing 1 via a pair of opposite bearings 9a, 9b. In order to provide for adjustment of the differential case 5 and ring gear 7, a pair of adjustment collars 11a, 11b are disposed between the bearings 9a, 9b and the differential case 5. A first adjustment collar 11a is disposed on the side of the differential case 5 adjacent the ring gear 7. A second adjustment collar 11b is disposed on the opposite side of the differential case 5. Each of the adjustment collars 11a, 11b threadingly engage the differential case 5 along threaded interface 13a, 13b. Locking collars 15a, 15b are provided to lock the adjustment collars 11a, 11b once the position of the differential case 5 and bearing preload are established. The locking collars 15a, 15b are formed as an annular member having a plurality of teeth engaging corresponding spanner slots formed in the adjustment collars 11a, 11b. The locking collars 15a, 15b are simply bolted to the differential case 5 via bolts to prevent relative rotation of the adjustment collar 15a, 15b relative to the differential case 5. The method of adjusting the differential assembly will now be explained.

The adjustment collars 11a, 11b are loosely threaded onto the associated portion of the differential case 5. The bearings 9a, 9b are then pressed onto the adjustment collars 11a, 11b. The differential assembly together with the adjustment collars 11a, 11b and bearings 9a, 9b are then installed within the housing 1 forming a rotatable connection between the differential case 5 and housing 1. The first adjustment collar 11a is rotated to displace and position the differential case 5 together with the ring gear 7. Simple rotation of the first adjustment collar 11a causes the differential case 5 and ring gear 7 to translate in the direction of the axle shafts. The adjustment collar 11a is rotated appropriately to position the ring gear 7 in alignment with a pinion gear (not shown) of an associated drive shaft. Once the differential case 5 and ring gear 7 are properly positioned the bearing pre-load is adjusted by rotating the second adjustment collar 11b. When the proper bearing pre-load is established, the locking collars 15a, 15b are bolted to the differential case 5 to lock the assembly in place.

Figure 4:
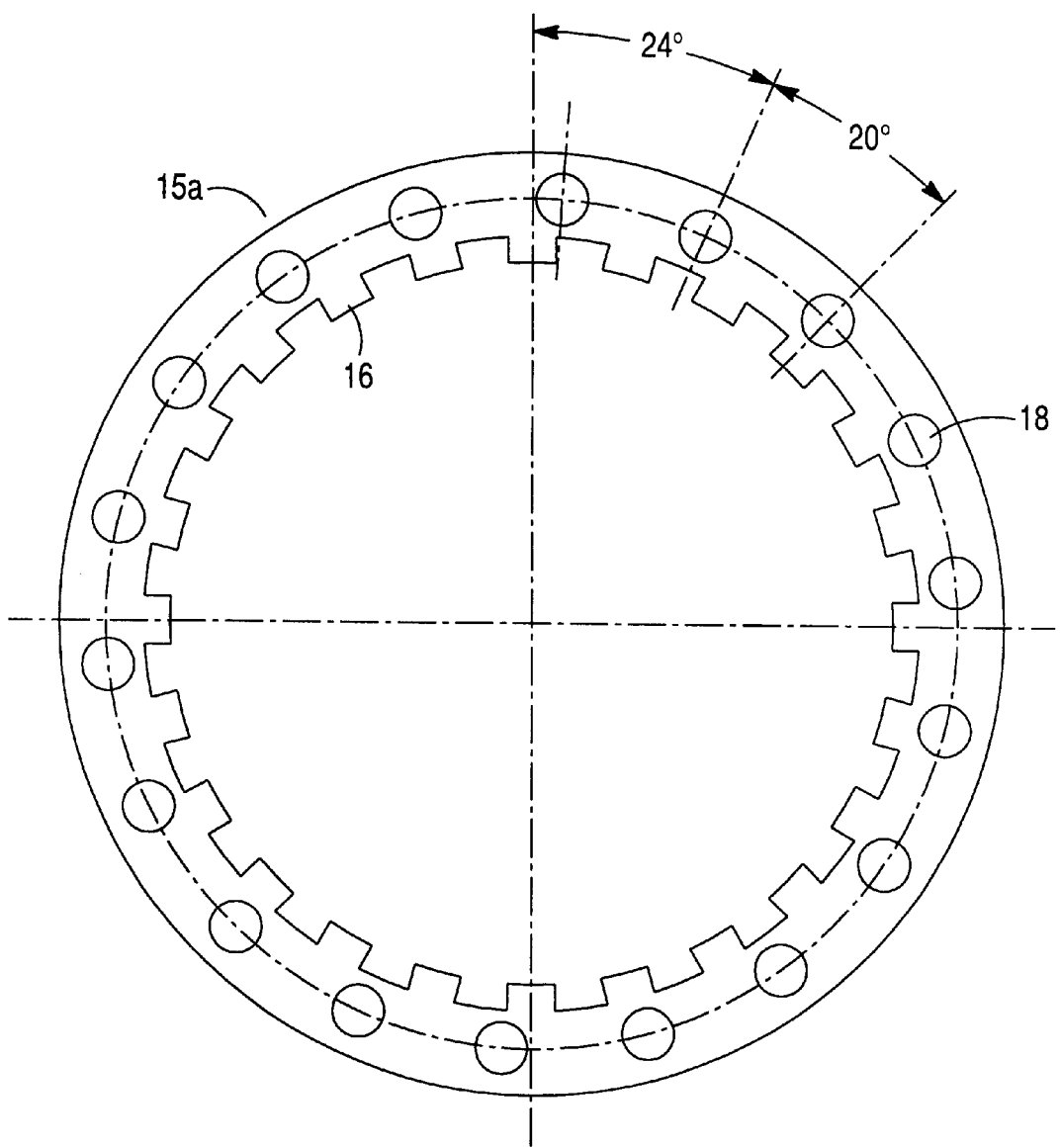
FIG. 4 is a view of the locking collar according to the present invention.

FIG. 4 is a side view of the locking collar 15a of the present invention. The locking collar 15a is preferably made of an annular metal member having a plurality of internal teeth 16 which engage corresponding spanner slots formed in the adjustment collar 11a. A plurality of bores 18 extend through the locking member 15a to facilitate bolting to the differential case 5. Once the adjustment collar 11a has been rotated to achieve the proper position for the differential case 5 and bearing preload, the locking collar 11a is simply bolted to the differential case 5. Preferably four bolts are used to secure the locking collars 15a, 15b to the differential case 5. Note that the preferred embodiment utilizes eighteen bores 18 equally spaced about the locking collar 15a and twenty-four internally projecting teeth 16. The bores 18 and teeth 16 are circumferentially offset from one another.

Having a different number of offset bores 18 helps to ensure that at least two bores 18 will always line up with corresponding holes in the differential case 5. Such an arrangement facilitates easy assembly without having to significantly rotate the adjustment collar 11a once final adjustment has been achieved.

Figure 2:
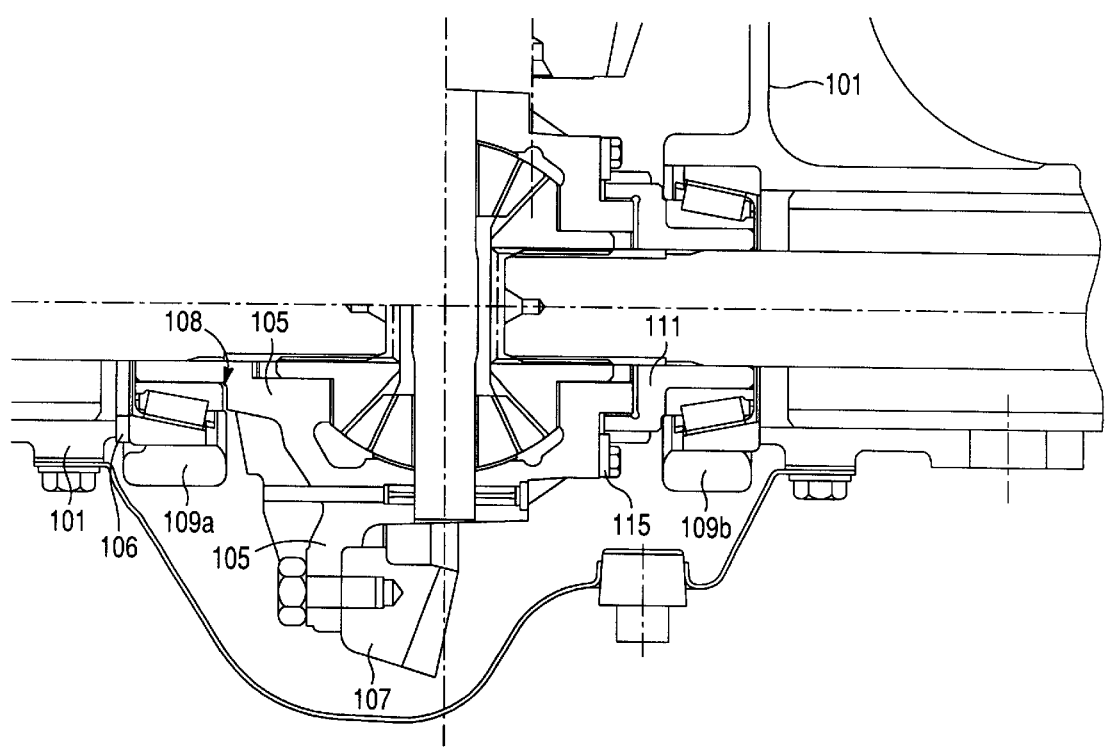
FIG. 2 is a partial sectional view of an axle assembly with adjustable differential case according to an alternate embodiment of the present invention.

FIG. 2 represents and alternate embodiment of the present invention. Rather than two adjustment collars, a single adjustment collar 111 is utilized. In the embodiment of FIG. 2, a spacer 106 is disposed between a first one of the bearings 109a and the housing 101 on the side of the differential case 105 adjacent the ring gear 107. At least one of a plurality of shims 108 is disposed between the first bearings 109a and the differential case 105. The position of the differential case 105 together with the ring gear 107 is determined by selectively choosing a thickness of the spacer 106 and a select number of a plurality of shims 108. Once the differential assembly is installed with the proper spacer 106 and shims 108, the adjustment collar 111 is rotated to set the bearing preload. The locking collar 115 is then bolted to the differential case 105 similar to the embodiment of FIG. 1.

Figure 3:
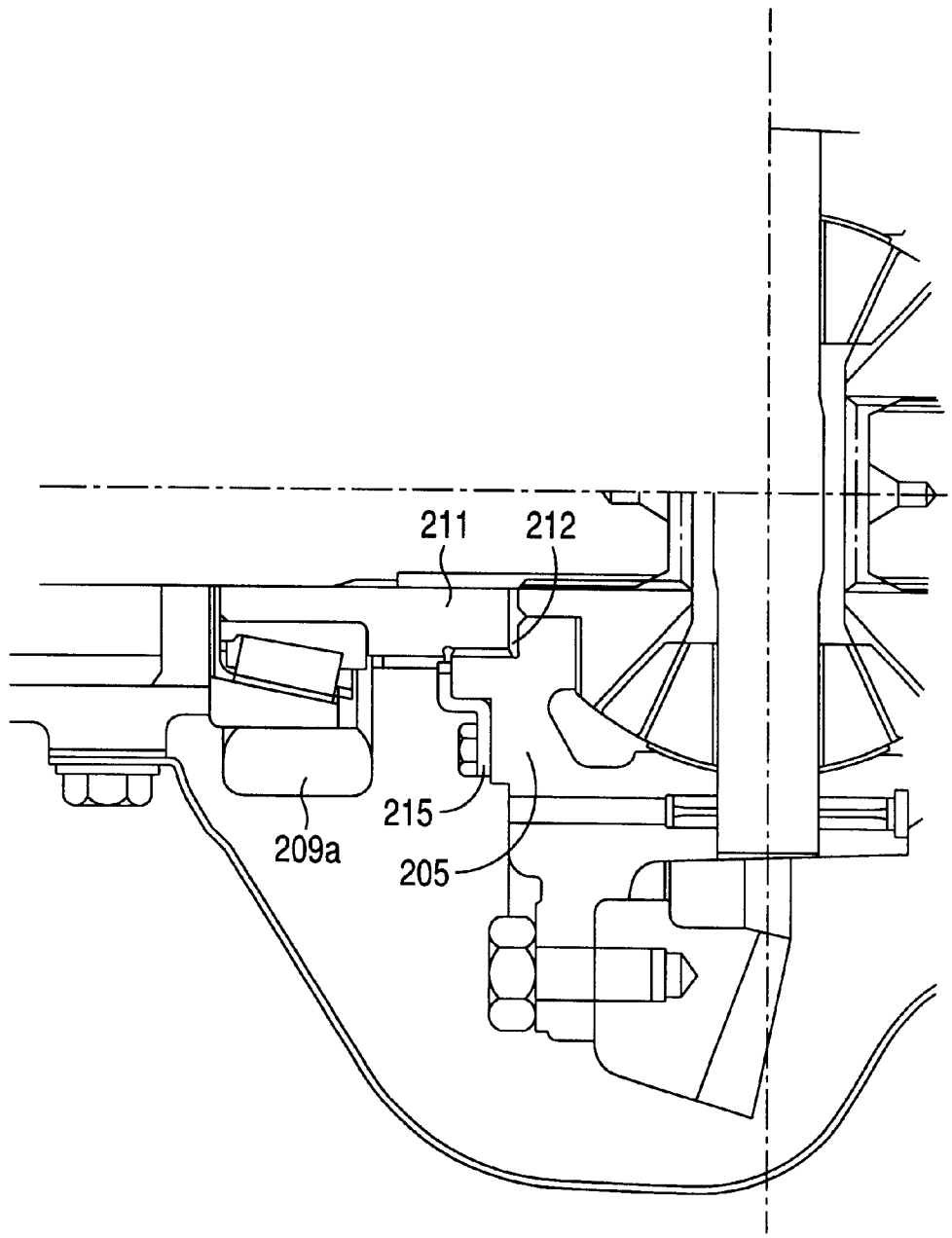
FIG. 3 is a partial sectional view of an axle assembly with adjustable differential case according to an alternate embodiment of the present invention.

FIG. 3 represents another alternative embodiment of the present invention. The embodiment of FIG. 3 is similar to the embodiment if FIG. 1. However, the adjustment collar 211 is partially disposed and threadingly engages an annular recess 212 formed in said differential case 205. As in the previous embodiments, adjustment of the position of the differential case 205 and bearing preload is simply made by rotating the adjustment collar 211. Once the proper position and preload are established, the locking collar 215 is simply bolted to the differential case 205. The locking collar 21 may have a stepped portion engaging an associated stepped shoulder formed in the differential case 205. However, the basic operation of the adjustment 211 and locking collars 215 is very similar to the previous embodiments.

While the foregoing invention has been shown and described with reference to a preferred embodiment, it will be understood by those possessing skill in the art that various changes and modifications may be made without departing from the spirit and scope of the invention. For example it is preferred to form the adjustment collars 11a, 11b and locking collars out of steel. However, other materials of sufficient strength may be employed.

What is claimed is:

1. An axle assembly comprising:

a housing;

a differential case rotatably mounted within said housing, said differential case having a ring gear non-rotatably fixed thereto for engaging a pinion gear;

at least one adjustment collar disposed between said differential case and said housing and threadingly engaging said differential case to selectively position said differential case and ring gear relative to said housing.

2. The axle assembly according to claim 1, said assembly further comprising:

a locking collar fixed to said differential case and engaging said adjustment collar to prevent rotation of said adjustment collar relative to said differential case.

3. The drive axle assembly according to claim 2, wherein said locking collar comprises:

an annular member having a plurality of teeth engaging an associated slot formed in said adjustment collar and having a plurality of holes provided to align with at least one of a plurality of bores formed in said differential case, and said locking collar and differential case are bolted together through at least one of said holes to prevent relative rotation there between, thereby fixing said adjustment collar in both rotational and axial positions relative to said differential case.

4. The axle assembly according to claim 1, wherein said at least one adjustment collar comprises a first adjustment collar disposed on one side of said differential case proximate said ring gear and a second adjustment collar disposed on an opposite side of said differential case, said assembly further comprising a pair of bearings one each disposed between each of said adjustment collars and said housing to provide a rotatable connection between said differential case and said housing.

5. A method of adjusting the axle assembly of claim 4 by positioning the differential case relative to said housing, said method comprising the steps of:

rotating said first adjustment collar relative to said differential case to selectively position said differential case relative to said housing.

6. A method of adjusting the axle assembly of claim 4 by positioning the differential case relative to said housing and by adjusting a preload of said bearings said method comprising the steps of:

rotating said first adjustment collar relative to said differential case to selectively position said differential case relative to said housing; and rotating said second adjustment collar relative to said differential case to adjust a preload of said bearings.

7. The axle assembly according to claim 1, wherein said adjustment collar is partially disposed and threadingly engages an annular recess formed in said differential case.

8. An axle assembly comprising:

a housing;

a differential case mounted within said housing, said differential case having a ring gear non-rotatably fixed thereto for engaging a pinion gear;

a pair of bearings disposed between said differential case proximate opposite sides thereof and said housing thereby forming a rotatable connection there between;

one of at least one shim disposed between said differential case and a first one of said bearings and a spacer disposed between said first bearing and said housing to position said differential case and ring gear relative to said housing; and an adjustment collar disposed between said differential case and a second one of said bearings, said adjustment collar threadingly engaging said differential case whereby rotation of said adjustment collar adjusts a preload of said bearings.

9. The axle assembly according to claim 8, wherein said spacer is disposed between said first bearing and said housing and said at least one shim is disposed between said first bearing and said differential case.

10. A method of adjusting the axle assembly of claim 9 by adjusting the position of said differential case relative to said housing, said method comprising the steps of:

selectively choosing a thickness of said spacer and providing a select number of shims between said differential case and said first bearing.

\* \* \* \* \*